UNITED STATES PATENT OFFICE.

JONAS W. AYLSWORTH, OF EAST ORANGE, NEW JERSEY, ASSIGNOR OF ONE-HALF TO FRANK L. DYER, OF MONTCLAIR, NEW JERSEY.

PLASTIC COMPOSITION AND METHOD OF PREPARING THE SAME.

1,046,420.

Specification of Letters Patent. Patented Dec. 3, 1912.

No Drawing. Original application filed February 11, 1910, Serial No. 543,238. Divided and this application filed October 7, 1911. Serial No. 653,402.

*To all whom it may concern:*

Be it known that I, JONAS W. AYLSWORTH, a citizen of the United States, and a resident of East Orange, in the county of Essex and State of New Jersey, have made a certain new and useful Invention in Plastic Composition and Methods of Preparing the Same, of which the following is a description.

This application is a division of my application, Ser. No. 543,238, filed Feb. 11, 1910, entitled phenolic condensation product and method of preparing same, patented March 19, 1912, No. 1,020,593. The said application relates to infusible condensation products of phenol and substances containing the methylene radical, $CH_2$, and methods of preparing the same. Therein are described products formed by combining a fusible resinous phenolic condensation product with a methylene-amin compound, and a method of producing the same, and also modified products and processes in which solid solutions of the first named products with various described substances are formed. In some instances the last mentioned substances have the function of fixing or combining with ammonia, in the product.

This application relates to all of the said solid solution products and processes, and the object of this invention, as claimed herein, is to produce compositions of the character referred to, having new and useful characteristics, and to devise a method for preparing the same, as will be hereinafter more particularly described, and pointed out in the appended claims.

In my application Serial No. 496,060, composition and process for manufacturing the same, filed May 14, 1909, I describe an ultimate infusible insoluble condensation product of phenol and formaldehyde or their equivalents, which is prepared by first forming a fusible condensation product of phenol and formaldehyde, in which the aldehyde is all combined with the phenol, and the phenol is all, or nearly all, combined with the aldehyde, and then causing a further reaction between the same and an additional amount of an aldehyde, preferably a polymerized form of formaldehyde, and in an amount just sufficient to combine with all of the fusible condensation product and any free phenol contained therein, to form the desired ultimate infusible condensation product.

In my Patent No. 1,020,593, of which this is a division, I describe a product formed by combining a fusible anhydrous resinous condensation product of a phenol and an aldehyde with a methylene-amin compound, such as hexa-methylene-amin, or hexa-methylene-tetra-amin as it is sometimes called $(CH_2)_6N_4$. Or in place of the latter, the mixture of salts obtained by the combination of aqueous solutions of ammonia and formaldehyde might be used. The fusible anhydrous resinous condensation product referred to above, (hereafter termed a "phenol resin") is first prepared by causing a reaction between suitable amounts of phenol and formaldehyde or their equivalents without the aid of any catalytic or condensing agent, as described in my application Ser. No. 496,060 above referred to. This operation is conducted in such a manner that a fusible anhydrous resin results, which is thinly fluid when molten, the resin being completely dehydrated, after the condensation reaction, by heating to a sufficient temperature, as 400° F., under atmospheric pressure. As is stated in the said application, heating to such a temperature drives off all the water, both free and combined, from the fusible resin. This dehydrated resin is mixed with a methylene-amin compound, also anhydrous, in definite proportions, forming a mass which is fluid at temperatures between 200 degrees F. and 240 degrees F., and which, when maintained at these temperatures or higher temperatures for a short time, will harden to a hard infusible chemically inert mass. This ultimate condensation product possesses great tensile strength. Counteracting pressure need not be used during the reaction between the fusible condensation product and the methylene-amin compound, and this reaction is not accompanied by evolution of formaldehyde, water, or other gaseous products, which, if evolved, would bubble through the mass and render the product porous and useless for many purposes.

It will be seen that the process thus far disclosed differs from the process for forming an infusible phenolic condensation product disclosed in my application Ser. No.

496,060, above referred to, broadly by the substitution of a methylene-amin compound for the paraformaldehyde or other polymerized formaldehyde, which, in my previous invention, I combine with the fusible phenol resin to form the ultimate condensation product. I have found that the methylene-amin is superior to an aldehyde for addition to the phenol resin for hardening the mass, for a number of reasons. It has no tendency to cause foaming of the mass even if an excess of methylene-amin is used above the amount which I have discovered to be necessary to combine with all of the phenol resin to harden the same. Paraformaldehyde or other aldehyde added to the phenol resin in my previous invention tends to escape as gas if an excess is used above the amount necessary to combine all of the phenol resin, or if the final reaction is carried on too speedily or under too intense a heat. In the case of the amin compound, however, there is no free formaldehyde and the methylene radical can only be separated from the nitrogen by its being taken away from the same by reaction with the phenol resin with which it combines in exchange for some of the hydrogen of the resin which unites with the nitrogen, to form ammonia. Methylene never exists in the free state, and hence the methylene-amin used cannot cause bubbling or gassing. Therefore, when the methylene-amin is used, great care need not be taken to prevent the addition of a slight excess of this element to prevent foaming of the mass.

Another advantage of the methylene-amin compound over the paraformaldehyde for the function referred to is that it will cause a hardening of the mass at a much lower temperature than will the paraformaldehyde. This is of particular advantage when the substance is to be used in mixture with or in impregnating cellulose fabrics, wood pulp, or other substances which are injured by temperatures above 280 degrees F.

By quantitative synthesis, I have determined the apparent constitution of the particular phenol resin which has the desirable properties required for a mass which will be sufficiently fluid when molten to be cast at a temperature below that at which the mass hardens and becomes infusible. This phenol resin or fusible condensation product of phenol and formaldehyde is apparently

or

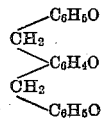

That is, approximately two parts of formaldehyde are caused to combine with three parts of phenol by molecular weight. Two molecules of formaldehyde apparently combine with three molecules of phenol in the manner indicated with the evolution of two molecules of water. This formula gives a molecular weight for the fusible product of 306, which checks up quite well with the determination of the weight made by physical means, indicating that the molecule cannot be of double molecular weight or any other multiple of the weight here shown when prepared with pure ingredients and at proper temperatures. In practical operations, however, such care as to purity and temperature is not essential to obtain a product suitable for the use herein mentioned, and such phenol resin products may be a mixture of the above compositions with others of higher molecular weight due to polymerization or to decomposition from long treating at high temperature.

To produce the final product, I combine 100 parts by weight of the fusible anhydrous pure phenol resin with from 7.6 to 12 parts of hexa-methylene-tetra-amin at a temperature of preferably 220 degrees F., together with the ammonia-fixing, or other solid solvent or plasticity agent, as will be hereinafter described. The proportions require to be varied within the limits indicated, because the fusible resin sometimes contains more or less free phenol, which should be combined with the methylene radical of the methylene-amin to produce the final infusible product. This is in agreement with the following equation:

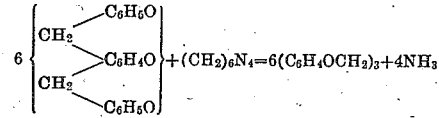

This reaction causes the formation of an infusible refractory resinous amorphous mass of pale yellowish amber color when the reacting substances are pure. The ammonia radical, $NH_3$, is retained in the mass in unstable combination and part may be removed by pulverizing and warming.

Half of the ammonia is liberated from the product at about 260 degrees F. if it is formed in thin films to facilitate the removal of the ammonia, and at 340 degrees F. practically all of the ammonia is evolved. It is, however, not practicable to so treat all objects to remove the ammonia by simple heat treatment, and even when such heat treatment is resorted to, the result is not the complete elimination of the ammonia, and considerable internal stresses may be set up, which are likely to cause cracks and warping in the product. If ammonia is not removed it remains either imprisoned in the intermolecular spaces of the mass, or in loose combination therewith. This product may cause corrosion of certain metals when it is used in contact with them, and on account of its tendency to absorb traces of water, the otherwise excellent insulating qualities of the product are impaired. To overcome these objectionable features, I prefer to add to the mass before hardening, a substance which will combine with and fix the ammonia and render it a permanent harmless constituent of the product. The substances which I find as a class to be satisfactory for this purpose are the organic acid anhydrids. Those which I find particularly well suited for the purpose are the anhydrids of the higher members of the series $C_nH_{2n}O_2$, or the acetic series, as it is often called, and also benzoic and phthalic anhydrid. The action of any of these substances is to combine with the ammonia and form acid amids, which remain in the product as a solid solvent of the same. This process and product are claimed herein.

The anhydrids of the organic acids are effective when used in amounts necessary to fix all or part of the ammonia in the produce. For most purposes, one-half the amount necessary to combine with the ammonia is sufficient, as a part of the ammonia is retained so tenaciously within the substance as to be unobjectionable. If any traces of moisture are present in the ingredients, they are effectively fixed by the acid anhydrid. It should also be noted that if any free phenol is present in the fusible resin to which the methylene-amin compound and the acid anhydrid are added, it may be combined with the acid anhydrid to form a phenyl ester.

If benzoic anhydrid is used, the proportion should be about: phenol resin 100 parts, hexa-methylene-tetra-amin 7.6 to 12 parts, benzoic anhydrid 4 to 9 parts. If stearic anhydrid is used, the proportion should be about: phenol resin 100 parts, hexa-methylene-tetra-amin 7.6 to 12 parts, stearic anhydrid 9 to 15 parts. The proportions vary slightly if other of the ammonia fixing agents mentioned are used, as may be determined by experiment. The amount of whatever anhydrid is used depends more or less upon the molecular weight of the particular anhydrid used. If the stearic anhydrid is used, it should be noted that this substance does not perfectly dissolve in the amount of phenol resin required, so, therefore, it is advisable to add a small amount of a substance which will cause the stearic anhydrid to emulsify or become miscible. The acid amid of stearic or other fatty acid is suitable when added in small amounts.

It should be noted that when an organic acid anhydrid is added to the mass it performs a triple functon, namely, to fix the ammonia, to fix any traces of moisture which may be present in the ingredients, and to act as a solid solvent or plasticity agent for the final product.

As I stated in the specification of my previous application referred to Ser. No. 496,060, I define a final product solvent as a substance which will dissolve the ultimate condensation product or combine therewith at the baking temperature, render it plastic at such temperature and remain as a part of the product in the condition of solid solution when hot or cold.

Any of the solid solvents referred to in the above mentioned application may be used in place of the organic acid anhydrid when it is not deemed necessary to fix the ammonia in the composition. Thus, I may use naphthalene and some of its derivatives such as nitro and chloro derivatives, especially the mono-nitro and di-nitro and mono-chloro naphthalenes, di-nitro benzene, preferably the meta variety, acetanilid, ricinoleic acid, ricinelaïdic acid, and their anhydrids, and di-phenylamin in suitable proportions, as described in my application above referred to.

It is obvious that the mass may have incorporated therewith any of the various fibrous or inert powdered substances as fillers, and also pigments as desired.

I do not limit the invention to the particular methylene-amin compound specifically referred to, the hexa-methylene-tetra-amin being given for the purpose of definite description, since it is a well known substance, which may readily be obtained in the pure state, other methylene-amins, such as the substance produced by the action of liquid ammonia on formaldehyde or its polymers in various proportions giving equally good results. If desired an acid amid of one of the higher members of the acetic series of acids may be formed and added to the ingredients, instead of adding the corresponding acid anhydrid and forming the amid within the mass by reaction between the anhydrid and the contained ammonia. My ultimate product is particularly useful when it contains a suitable acid amid, either formed by the interaction of the added acid anhydrid with the ammonia within the mass, or previously formed and added as a separate ingredient, as described, because the amid acts as a solid solvent and renders the mass sufficiently plastic when heated to take an impression from a die or mold. This effect was described in connection with the description of the functions of the product solvent elements in my previous application, Ser. No. 496,060 above referred to. I may also use an excess of the fusible phenol resin as a solid solvent if I desire. In that case, an amount of the methylene-amin less than the amount necessary to combine with quite all of the fusible phenol resin would be added to the latter, so that uncombined phenol resin, of an amount about equal to that of the other solid solvent elements referred to, would be provided for acting as a solid solvent for the ultimate product.

In my application, Ser. No. 630,893, filed June 2, 1911, upon which Patent No. 1,020,594 was granted Mar. 19, 1912, is described a process and product in which an organic acid or its anhydrid, specifically phthalic acid or anhydrid, is used as the solid solvent or plasticity agent. That application is generic to a product made with either formaldehyde or polymer, or hexa-methylene-tetra-amin, as the methylene-containing hardening agent, and contains claims specific to the formaldehyde species. This application is specific to a process in which hexa-methylene-tetra-amin is used, or ammonia is included in the mass, during reaction, the solid solvent or plasticity agent being claimed generically in the product and process claims, and also specifically as an ammonia-fixing element.

In the claims, the term "phenol" is to be understood as including the homologues and other equivalents of phenol, such as cresol, and the term "formaldehyde" is to be understood as including the polymers of formaldehyde.

Having now described my invention what I claim and desire to secure by Letters Patent is:—

1. The process of forming a hard condensation product which consists in incorporating a fusible phenolic condensation product with hexa-methylene-tetra-amin, and a final product solvent element, and heating the mixture sufficiently to harden the mass, substantially as described.

2. The process of forming a hard condensation product which consists in incorporating a fusible phenolic condensation product with hexa-methylene-tetra-amin, and a substance which is non-water-soluble and non-volatile at ordinary temperatures, and which dissolves in or combines with the product formed by heating the mass at sufficient temperature and renders the product plastic at such temperature, and heating the mixture sufficiently to harden the mass, substantially as described.

3. The process of forming a hard condensation product which consists in incorporating a fusible phenolic condensation product with hexa-methylene-tetra-amin, and a solid acid anhydrid of the acetic series, and heating the mixture sufficiently to harden the mass, substantially as described.

4. The process of forming a hard condensation product which consists in incorporating with a fusible phenolic condensation product hexa-methylene-tetra-amin in definite proportions and ingredients for fixing ammonia, and forming a solid solvent for the final product, and heating the mass to harden the same and fix free ammonia, substantially as described.

5. The process of forming a hard condensation product which consists in incorporating with a fusible phenolic condensation product hexa-methylene-tetra-amin in definite proportions and an ammonia fixing, solid solvent, element, and heating the mass to cause the methylene radical to combine with the fusible product to form an infusible product, ammonia to be formed and some of the same to be combined with the ammonia-fixing element, substantially as described.

6. In a process for forming an infusible phenolic condensation product, the step which consists in adding an ammonia-fixing, solid solvent, element, to ingredients suitable to produce such product by reaction, and which include ammonia during such reaction, substantially as described.

7. The process of forming an infusible phenolic condensation product, which consists in adding an ammonia-fixing solid solvent, element, to ingredients including phenolic and methylene containing bodies, which ingredients, during subsequent reaction, also contain ammonia, and heating the mass to cause such reaction and accordingly to form the said product, substantially as described.

8. The process of forming an infusible phenolic condensation product which consists in adding an organic acid anhydrid to ingredients including phenolic and methylene containing bodies, which ingredients during subsequent reaction also contain ammonia and heating the mass to cause such reaction and accordingly to form the said product, substantially as described.

9. As a new composition of matter, a final condensation product of methylene and phenol, or a homologue or derivative of phenol, and containing an organic acid amid, substantially as described.

10. As a new composition of matter, the hard infusible product formed by the combination under sufficient heat of a fusible phenolic condensation product with hexa-methylene-tetra-amin, and a final product solvent element, substantially as described.

11. As a new composition of matter, the hard infusible product formed by the combination under sufficient heat of a fusible phenolic condensation product with hexa-methylene-tetra-amin, and an organic acid anhydrid, substantially as described.

12. As a new composition of matter, a final condensation product of methylene and phenol, or a homologue or derivative of phenol, and containing an organic acid amid and phenyl ester, substantially as described.

13. As a new composition of matter, the hard infusible product formed by the combination under sufficient heat of a fusible phenolic condensation product with hexamethylene-tetra-amin, and an ammonia fixing element, substantially as described.

This specification signed and witnessed this 3d day of October, 1911.

JONAS W. AYLSWORTH.

Witnesses:
　DYER SMITH,
　KIRK BROWN.